United States Patent
Swift et al.

(10) Patent No.: US 6,377,691 B1
(45) Date of Patent: Apr. 23, 2002

(54) CHALLENGE-RESPONSE AUTHENTICATION AND KEY EXCHANGE FOR A CONNECTIONLESS SECURITY PROTOCOL

(75) Inventors: Michael M. Swift, Seattle; Bharat Shah, Newcastle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/762,166

(22) Filed: Dec. 9, 1996

(51) Int. Cl.$^7$ ................................. H04L 9/00
(52) U.S. Cl. ........................................ 380/277
(58) Field of Search ............................. 380/21, 23, 25, 380/49, 280, 277, 247, 270; 395/200.59, 187, 186, 188.01, 684, 187.01; 713/171, 155, 168, 170

(56) References Cited

U.S. PATENT DOCUMENTS

| 4,747,050 A | 5/1988 | Brachtl et al. ................. 705/78 |
| 4,755,940 A | 7/1988 | Brachtl et al. ................. 705/44 |
| 4,941,089 A | 7/1990 | Fischer ....................... 709/231 |

(List continued on next page.)

OTHER PUBLICATIONS

Lloyd, B. and W. Simpson Network Working Group. [PPP Authentication Protocols] 1992 Oct.; <RFC: ftp://ftp.isi.edu/in–notes/rfc1334.txt>. [Accessed Aug. 16, 1999].

(List continued on next page.)

*Primary Examiner*—Gail Hayes
*Assistant Examiner*—James Seal
(74) *Attorney, Agent, or Firm*—Klarquist Sparkman, LLP

(57) ABSTRACT

The disclosed system uses a challenge-response authentication protocol for datagram-based remote procedure calls. Using a challenge-response authentication protocol has many advantages over using a conventional authentication protocol. There are two primary components responsible for communication using the challenge-response protocol: a challenge-response protocol component on the client computer (client C-R component) and a challenge-response protocol component on the server computer (server C-R component). In order to start a session using the challenge-response protocol, the client C-R component first generates a session key. The session key is used by both the client C-R component and the server C-R component for encrypting and decrypting messages. After creating the session key, the client C-R component encrypts a message containing a request for a remote procedure call and sends it to the server C-R component. In response, the server C-R component sends a challenge to the client C-R component. The challenge contains a unique identifier generated by the server C-R component. The client C-R component responds to the challenge by sending a challenge response and the session key. The challenge response is the unique identifier contained within the challenge encrypted with the password of the user of the client computer. The session key is also encrypted using this password. Upon receiving the challenge response, the server C-R component uses its copy of the client's password to create its own version of the challenge response and compares it to the version received from the client C-R component. If the two versions of the challenge response are identical, the identity of the user of the client computer has been verified. If the two versions are not identical, an attempted unauthorized access has been detected. After verification, the server C-R component extracts the session key, decrypts the message, and invokes the requested procedure of the server program. Subsequently, the server C-R component will send and receive encrypted messages from the client C-R component, thereby facilitating a remote procedure call.

28 Claims, 7 Drawing Sheets

U.S. PATENT DOCUMENTS

| | | | |
|---|---|---|---|
| 5,202,922 A | * 4/1993 | Iijima | 380/45 |
| 5,301,280 A | 4/1994 | Schwartz et al. | 709/237 |
| 5,406,628 A | * 4/1995 | Beller et al. | 380/30 |
| 5,416,842 A | 5/1995 | Aziz | 380/30 |
| 5,588,060 A | 12/1996 | Aziz | 380/30 |
| 5,606,719 A | 2/1997 | Nichols et al. | 710/56 |
| 5,625,775 A | 4/1997 | Davis et al. | 709/227 |
| 5,629,933 A | 5/1997 | Delp et al. | 370/411 |
| 5,633,933 A | 5/1997 | Aziz | 380/30 |
| 5,668,877 A | 9/1997 | Aziz | 380/30 |
| 5,689,566 A | * 11/1997 | Nguyen et al. | 380/25 |
| 5,721,779 A | * 2/1998 | Funk | 380/23 |
| 5,764,890 A | 6/1998 | Glasser et al. | 713/202 |
| 5,802,178 A | 9/1998 | Holden et al. | 713/151 |
| 5,848,161 A | 12/1998 | Luneau et al. | 705/78 |
| 5,884,316 A | 3/1999 | Bernstein et al. | 707/103 |
| 5,889,957 A | 3/1999 | Ratner et al. | 709/207 |
| 5,918,019 A | 6/1999 | Valencia | 709/2 |

OTHER PUBLICATIONS

Simpson, W. Network Working Group. [PPP Challenge Handshake Authentication Protocol (CHAP)] 1996 Aug.; <RFC: ftp://ftp.isi.edu/in–notes/rfc1994.txt>. [Accessed Aug. 16, 1999].

Schneier, Bruce, *Applied Cryptography*, John Wiley & Sons, Inc., New York, pp. 219–243, 1994.

Neuman, B. Clifford and Theodore Ts'o, "Kerberos: An Authentication Service for Computer Networks," USC/ISI Technical Report No. ISI/RS–94–399, reprinted from *IEEE Communications Magazine*, vol. 32, No. 9, pp. 33–38, 1994.

* cited by examiner

CHALLENGE-RESPONSE AUTHENTICATION AND KEY EXCHANGE FOR A CONNECTIONLESS SECURITY PROTOCOL

TECHNICAL FIELD

The present invention relates generally to data processing systems and, more particularly, to utilizing a challenge-response authentication protocol for datagram-based or connectionless remote procedure calls.

BACKGROUND OF THE INVENTION

A "remote procedure call" (RPC) refers to a client program invoking a procedure or function of a remote server program, where the two computer-programs are typically in separate address spaces on a single computer or the two computer programs are on separate computers. After invoking the procedure, the results of the invocation (e.g., success or failure) and any output parameters are usually returned to the client program.

FIG. 1 depicts a block diagram of a conventional system for performing remote RPCs. The conventional RPC system, as depicted in FIG. 1, has a client computer 102 interconnected to a server computer 104 by a network 106. The client computer contains a client program 108, an RPC runtime facility 110, and a transport layer 112. The client program 108 is the originator of an RPC. The RPC runtime 110 receives a message containing a request for the RPC from the client program 108, encrypts the message, and passes the encrypted message to the transport layer 112. The RPC runtime 110 encrypts messages that are sent, as well as decrypts messages that are received. The encryption is performed using an encryption algorithm with an encryption key. By using the encryption algorithm with the encryption key, plain text can be encrypted, and conversely, the encrypted text can be decrypted using the same key and the same algorithm. Sometimes the encryption key is only valid for a single session or conversation between the client computer 102 and the server computer 104. In this situation, the encryption key is referred to as a "session key."

The transport layer 112 receives an encrypted request for an RPC from the RPC runtime 110 and transmits the encrypted request to the transport layer 118 of the server computer 104 by dividing the request into a number of packets and sending the packets across the network 106. This technique is known as packet switching. Although the client computer 102 and the server computer 104 appear to be directly connected by the network 106, in most circumstances, they will not be, and therefore, the packets must be routed between other, intermediate computers ("nodes") within the network. Each node may be used for routing one or more packets between the client computer 102 and the server computer 104. There are two techniques for sending packets across a network: virtual circuit transmission and datagram transmission. In virtual circuit transmission, the routing through the network is fixed. That is, a path (a logical connection, i.e., "a virtual circuit") through the intermediate nodes is predetermined and all of the packets travel over this logical connection. In a datagram transmission, a single path for transmitting all the packets is not predetermined; rather, each packet can be sent on a different path. While virtual circuit transmission provides for predetermined routing decisions, datagram transmission can take advantage of real time fluctuations in network traffic and can lead to increased throughput because routing decisions are made in response to real time conditions in the network as each packet is transferred.

The server computer 104 contains a server program 114, an RPC runtime 116, and a transport layer 118. The server program 114 acts as the recipient of the remote procedure call. In other words, a function of the server program 114 is remotely invoked by the client program 108. The transport layer 118 performs a similar function to the transport layer 112. The RPC runtime facility 116 performs encryption and decryption of messages to provide for secure communications and also performs authentication to prevent unauthorized access to the server computer 104. One type of unauthorized access is known as replay. The term "replay" refers to a situation where an intruder listens to and records the conversation of both the client computer 102 and the server computer 104 and then replays the conversation (i.e., the messages) to violate the integrity of the system. In order to prevent replay and other types of unauthorized access during an RPC, the client computer 102 and the server computer 104 communicate using an authentication protocol that verifies the identity of the originator of the RPC (i.e., the client program being run under a particular user's account). It also verifies that the same packets are not received twice.

When an RPC is performed using a transport layer that communicates using virtual circuit transmission, various authentication protocols can be used because the client is notified when the server terminates the logical connection. That is, in a virtual circuit transmission, the transport layers form a logical connection between the RPC runtime 110 on the client computer 102, through the intermediate nodes in the network 106 and to the RPC runtime 116 on the server computer 104. When this logical connection is broken, the RPC runtime on both ends of the logical connection is notified from its respective transport layer. The notification of failure facilitates the use of an authentication protocol in the following way. During the normal processing of an RPC, if the transport 118 has waited for what it considers to be too long of a time without receiving a communication from the transport 112, the transport 118 may drop the logical connection, upon the occurrence of which the server RPC runtime 116 will be notified and will discard all information relating to the session ("context information"), including the session key used to encrypt and decrypt the messages transferred during the session. In a connection-oriented RPC (i.e., an RPC over a virtual circuit connection), the client RPC runtime receives a notification that the logical connection has terminated and the client RPC runtime can then perform reauthentication and obtain another copy of the session key so that the session can resume. However, in the case of datagram transmissions, since there is no logical connection, the client RPC runtime does not receive a notification that the logical connection has terminated and the server RPC runtime has discarded its context information, so the client RPC runtime does not know to perform reauthentication and obtain the session key and thus the session cannot resume. As such, connection-oriented authentication protocols do not work when using datagram transmission.

To perform authentication for datagram-based remote procedure calls, the Kerberos protocol is typically used. FIG. 2 depicts a block diagram of the relevant components of a conventional RPC system 200 using the Kerberos protocol. In the conventional RPC system 200, a client computer 202 is interconnected to a server computer 204 via a network 208 and is also interconnected to an authentication server computer 206 via a network 210. A program on the client computer 202 invokes a function of a program on the server computer 204. The authentication server 206 is responsible for creating session keys that will be used by both the client computer 202 and the server computer 204 to encrypt and decrypt messages. The authentication server 206 sends the session keys to both the client computer 202 and the server computer 204 via its connection to the client computer 202. Obtaining the session key from the authentication server 206 is both inflexible and time consuming, because the authentication server dictates which session key to use, and the client computer is usually connected to the authentication server via a rather slow connection.

Another disadvantage of the Kerberos authentication protocol is the manner in which it prevents replay from occurring. In the Kerberos protocol, replay is prevented by both the client computer 202 and the server computer 204 maintaining synchronized clocks so that when the server computer receives a request for an RPC and decrypts the request, the server computer can determine whether the message is a replay of an earlier message by comparing a time stamp contained in the request to the server computer's internally synchronized clock. If the message is determined to be a replay, the server computer can conclude that the message originated from an intruder instead of a bona fide client. Although this method for preventing replay is effective, maintaining the synchronicity of the clocks of the client computer and the server computer adds significant overhead to the system and is rather difficult to perform. Based upon the above drawbacks to the Kerberos protocol, it is desirable to improve upon the authentication protocol used in a datagram-based RPC environment.

SUMMARY OF THE INVENTION

The disclosed system uses a challenge-response authentication protocol for datagram-based or connectionless remote procedure calls. Using a challenge-response authentication protocol has many advantages over using a conventional Kerberos authentication protocol. For example, in a system using the challenge-response authentication protocol, the client computer generates the session key and thus provides the client computer with the flexibility of choosing a more secure session key if it so desires. Furthermore, since the client generates the session key itself instead of having to receive it via a slow connection to a separate computer, the generation of the session key is less time consuming than in the conventional Kerberos authentication protocol system. Also, in using a challenge-response authentication protocol, replay is prevented without the use of synchronized clocks. Instead, replay prevention is an inherent part of the challenge-response protocol and is therefore performed in an easy and efficient manner with little overhead. Another advantage of using the challenge-response authentication protocol is that many existing network operating systems, such as WINDOWS NT available from Microsoft Corporation of Redmond, Wash., are capable of performing a similar type of protocol using virtual circuit transmission. Thus, providing a challenge-response protocol using datagram transmission can provide the above-described advantages with little modifications to existing network operating systems.

There are two primary components responsible for communicating using the challenge-response protocol: a challenge-response protocol component on the client computer (client C-R component) and a challenge-response protocol component on the server computer (server C-R component). In order to start a session using the challenge-response protocol, the client C-R component first generates a session key. The session key is used by both the client C-R component and the server C-R component for encrypting and decrypting messages. After creating the session key, the client C-R component encrypts a message containing a request for an RPC and sends it to the server C-R component. In response, the server C-R component creates a challenge and has it sent to the client C-R component. The challenge contains a unique identifier generated by the server C-R component. The client C-R component responds to the challenge by sending a challenge response and the session key. The challenge response is the unique identifier contained within the challenge encrypted with the password of the user of the client computer. The session key is also encrypted using this password. Upon receiving the challenge response, the server C-R component uses its copy of the client's password to create its own version of the challenge response and compares it to the version received from the client C-R component. If the two versions of the challenge response are identical, the identity of the user of the client computer has been verified. If the two versions are not identical, an attempted unauthorized access has been detected. After verification, the server C-R component extracts the session key, decrypts the message, and invokes the requested procedure of the server program. Subsequently, the server C-R component will send and receive encrypted messages from the client C-R component, thereby facilitating an RPC.

In accordance with a first aspect of the present invention, a data processing system is provided comprising a network communicatively connecting a client computer to a server computer. The server computer contains a server computer program, a server challenge-response protocol component, and a server transport component. The server computer program has a function for remote invocation and receives a request to invoke the function. The server challenge-response protocol component receives an encrypted request to invoke the function and sends a unique identifier to the client computer to request a key so that the encrypted request can be decrypted and passed to the server computer program. The server transport component sends and receives a plurality of packets as datagram transmissions over the network to facilitate the invocation of the function. The client computer comprises a client computer program, a client challenge-response protocol component, and a client transport component. The client computer program sends the request to remotely invoke the function of the server computer program. The client challenge-response protocol component receives and encrypts the request to remotely invoke the function, receives the unique identifier from the server challenge-response protocol component, encodes the unique identifier and sends the encoded unique identifier to the server computer with the key. The client transport component sends and receives the plurality of packets as datagram transmissions over the network to facilitate the invocation of the function.

In accordance with a second aspect of the present invention, a method is provided in a data processing system for a client computer program on a client computer having a client protocol component to invoke a function of a server computer program on a server computer having a server protocol component. The client computer and the server computer are interconnected by a network and communicate using datagram-based transmissions over the network. The client protocol component receives a request for invoking a function of the server computer program from the client computer program, encrypts the request using a key, and sends the encrypted request to the server computer via the network using the datagram-based transmissions. The server protocol component receives the encrypted request and sends a challenge containing a unique identifier to the client protocol component. The client protocol component receives the challenge, encodes the challenge and the key, and sends the encoded challenge and the encoded key to the server protocol component. The server protocol component receives the encoded challenge and the encoded key, decodes the encoded challenge and the encoded key, and decrypts the request using the decoded key to process the invocation of the function of the server computer program.

DETAILED DESCRIPTION OF THE INVENTION

Figure 1:
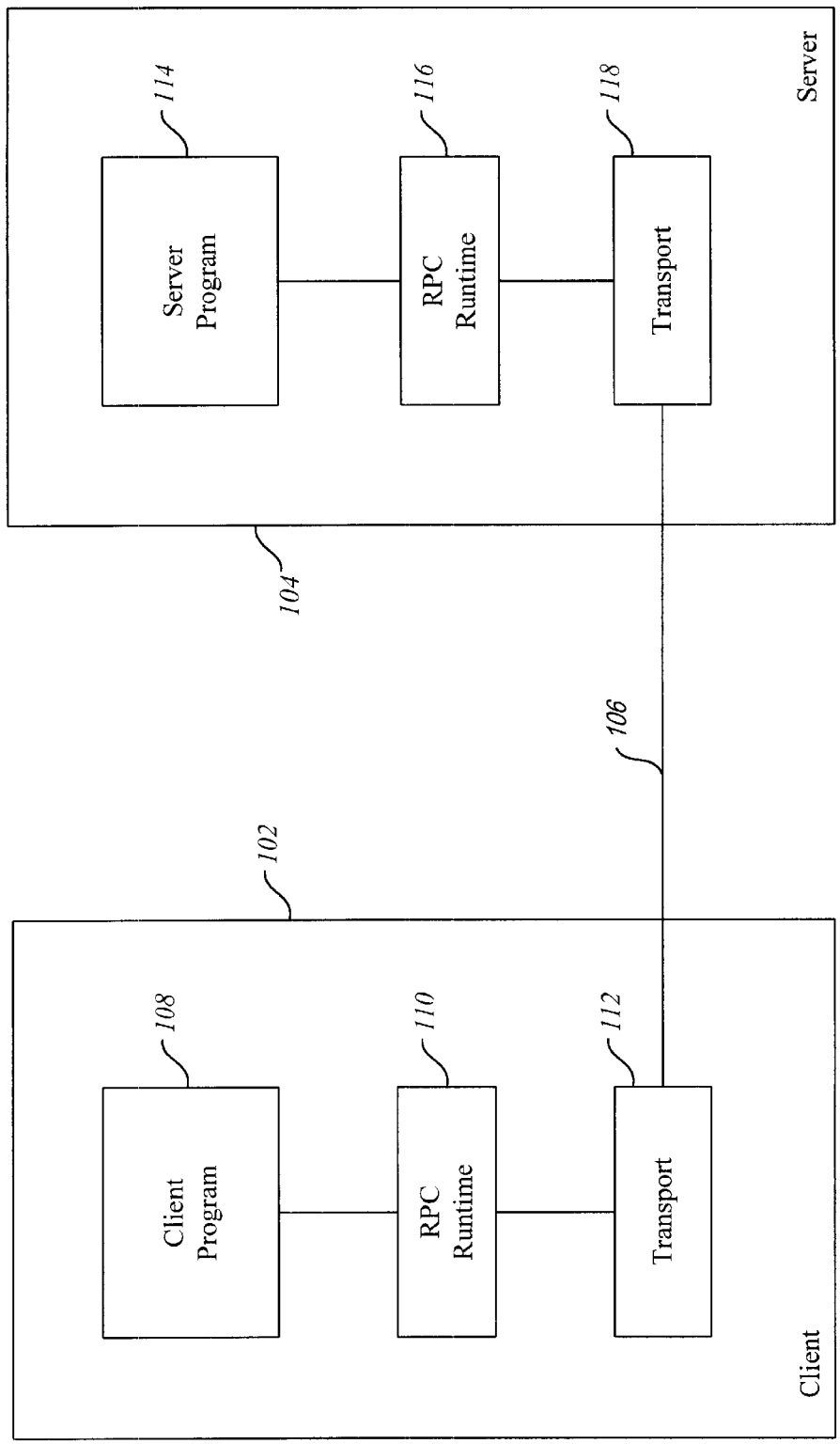
FIG. 1 depicts a conventional system for performing remote procedure calls.
Figure 2:
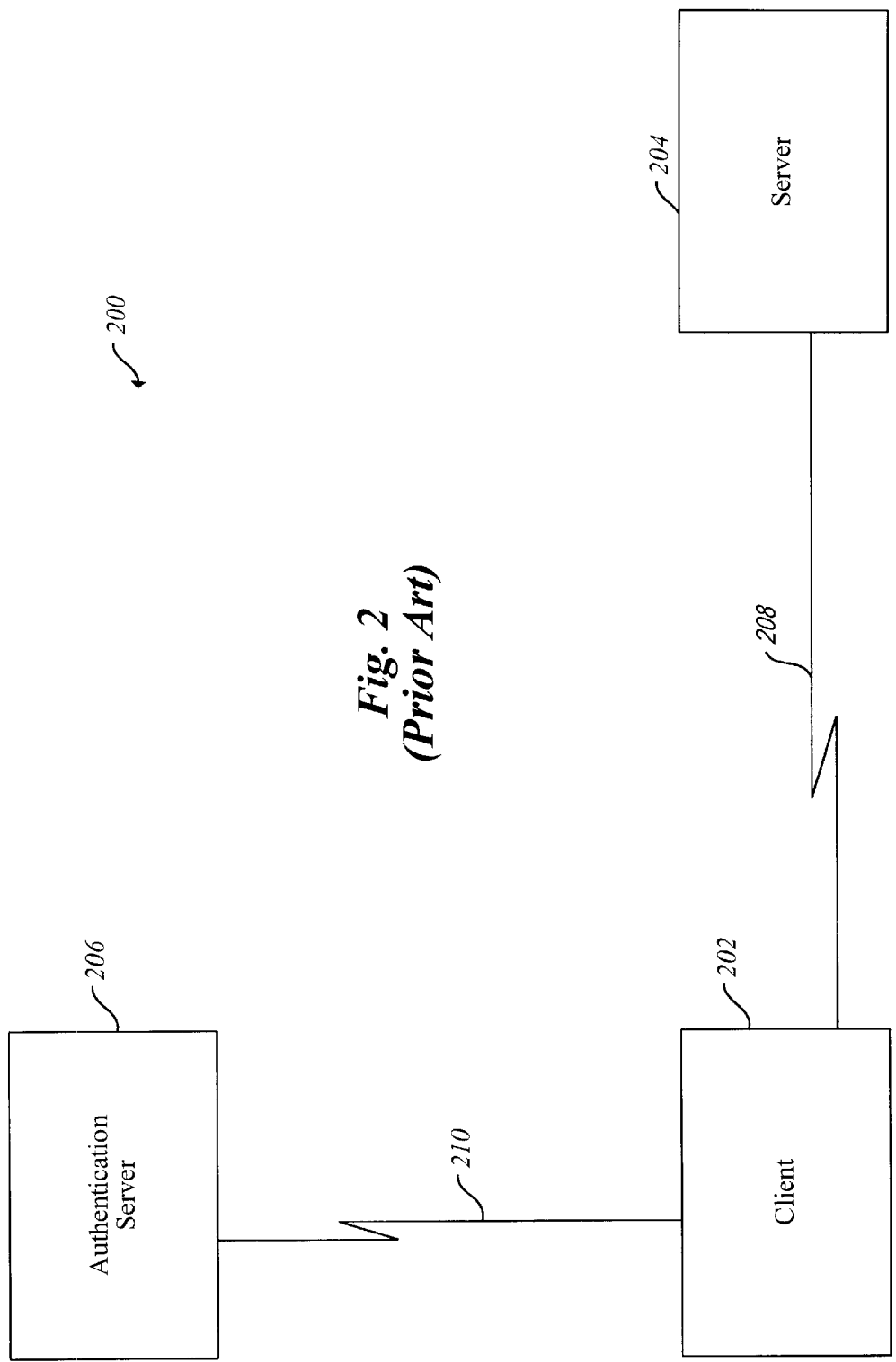
FIG. 2 depicts a conventional system using the Kerberos protocol for performing authentication during a remote procedure call.

A preferred embodiment of the present invention uses a challenge-response authentication protocol for datagram-based remote procedure calls. Using a challenge-response authentication protocol has many advantages over using a conventional Kerberos authentication protocol. For example, in a system using the challenge-response authentication protocol, the client computer generates the session key and thus provides the client computer with the flexibility of choosing a more secure session key if it so desires and does not need to interact with another entity to obtain a session key. Furthermore, since the client generates the session key itself instead of having to receive it via a slow connection to a separate computer, the generation of the session key is less time consuming than in the conventional Kerberos authentication protocol system. Also, in using a challenge-response authentication protocol, replay is prevented without the use of synchronized clocks. Instead, replay prevention is an inherent part of the challenge-response protocol and is therefore performed in an easy and efficient manner with little overhead. Another advantage of using the challenge-response authentication protocol is that many existing network operating systems, such as WINDOWS NT available from Microsoft Corporation of Redmond, Wash., are capable of performing a similar type of protocol using virtual circuit transmission. Thus, providing a challenge-response protocol using datagram transmission can provide the above-described advantages with little modifications to existing network operating systems.

As previously stated, a challenge-response protocol component on the client computer (client C-R component) and a challenge-response protocol component on the server computer (server C-R component) are responsible for performing the challenge-response authentication protocol. The challenge-response authentication protocol is a protocol in which the server C-R component sends a challenge, a unique identifier, to the client C-R component upon receiving a request from the client C-R component. The client C-R component encodes the challenge and returns it to the server as a challenge response so that the server can verify the identity of the user of the client computer. In order to start a session using the challenge-response protocol, the client C-R component first generates a session key. The session key is used by both the client C-R component and the server C-R component for encrypting and decrypting messages. After creating the session key, the client C-R component encrypts a message containing a request for an RPC and sends it to the server C-R component. In response, the server C-R component sends a challenge to the client C-R component. The challenge contains a unique identifier generated by the server C-R component. The client C-R component responds to the challenge by sending a challenge response and the session key. The challenge response is the unique identifier contained within the challenge encrypted with the password of the user of the client computer. The session key is also encrypted using this password. The challenge response also contains an indication of the user. Upon receiving the challenge response, the server C-R component uses its copy of the client's password to create its own version of the challenge response and compares it to the version received from the client C-R component. If the two versions of the challenge response are identical, the identity of the user of the client computer has been verified. If the two versions are not identical, an attempted unauthorized access has been detected. After verification, the server C-R component extracts the session key, decrypts the message, and invokes the requested procedure of the server program. Subsequently, the server C-R component will send and receive encrypted messages from the client C-R component, thereby facilitating an RPC.

When using the conventional Kerberos protocol, an authentication server that is a separate computer from either the client computer or the server computer is responsible for creating the session keys used by both the client computer and the server computer to decrypt messages. This use of the authentication server is both inflexible and time-consuming from the client's perspective, because the authentication server dictates which session key is used and the client computer is typically connected to authentication server via a rather slow connection. In the challenge-response protocol, on the other hand, the client generates the session key itself, so the client has the flexibility to use perhaps a more secure session key (i.e., more digits), and also, the client does not incur the overhead found in the Kerberos protocol.

Like most authentication protocols, the Kerberos protocol prevents a situation from occurring where an intruder listens to the conversation of both the client and the server so as to replay the conversation and violate the integrity of the system, which is known as replay. To prevent replay from occurring, both the client computer and the server computer maintain synchronized clocks so that when the server receives a request and decrypts a message, the server can determine whether the message is a replay of an earlier message and hence originated from an intruder instead of a bona fide client. The challenge-response protocol avoids the use of synchronized clocks in preventing replay, because each time a session is initiated, the server C-R component issues a challenge (a server-generated, random unique identifier) to which the client C-R component must respond and return. Thus, an intruder cannot predict the unique identifier and a replay could not happen. This challenge is issued by the server C-R component in other circumstances as well, such as when the server C-R component has discarded its session key.

Figure 3:
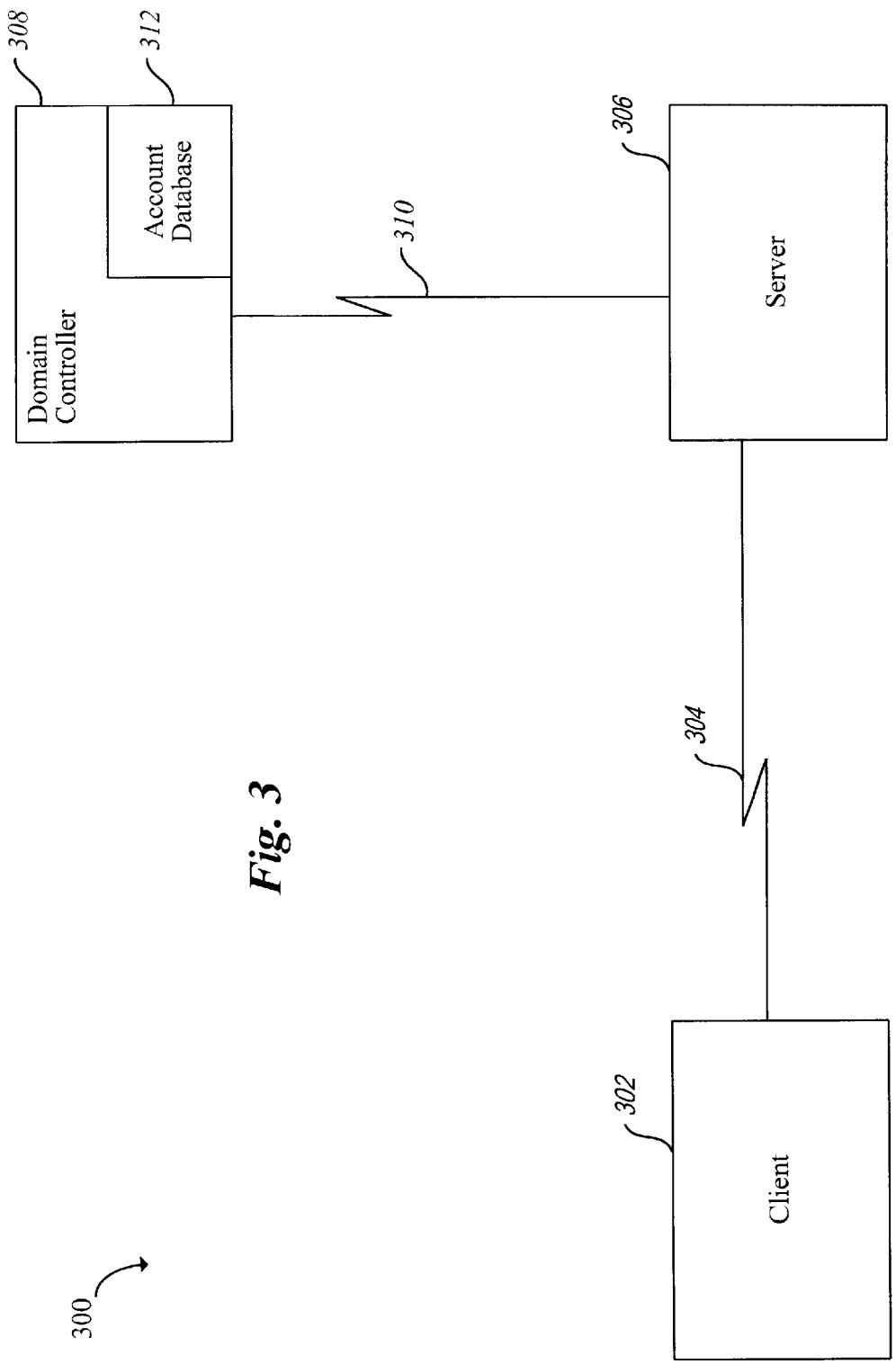
FIG. 3 depicts a data processing system suitable for practicing a preferred embodiment of the present invention.

FIG. 3 depicts a data processing system 300 that is suitable for practicing a preferred embodiment of the present invention. The data processing system 300 contains a client computer 302 interconnected to a server computer 306 by a network 304. The server computer 306 in turn is interconnected to a domain controller 308 by a network 310. The domain controller 308 contains an account database 312 that contains various information of the users who can use the client computer 302 to indirectly perform remote procedure calls on computer programs stored on the server computer 306. It should be appreciated that networks 304 and 310 may be either a local area network or a wide area network containing many other computers.

Figure 4:
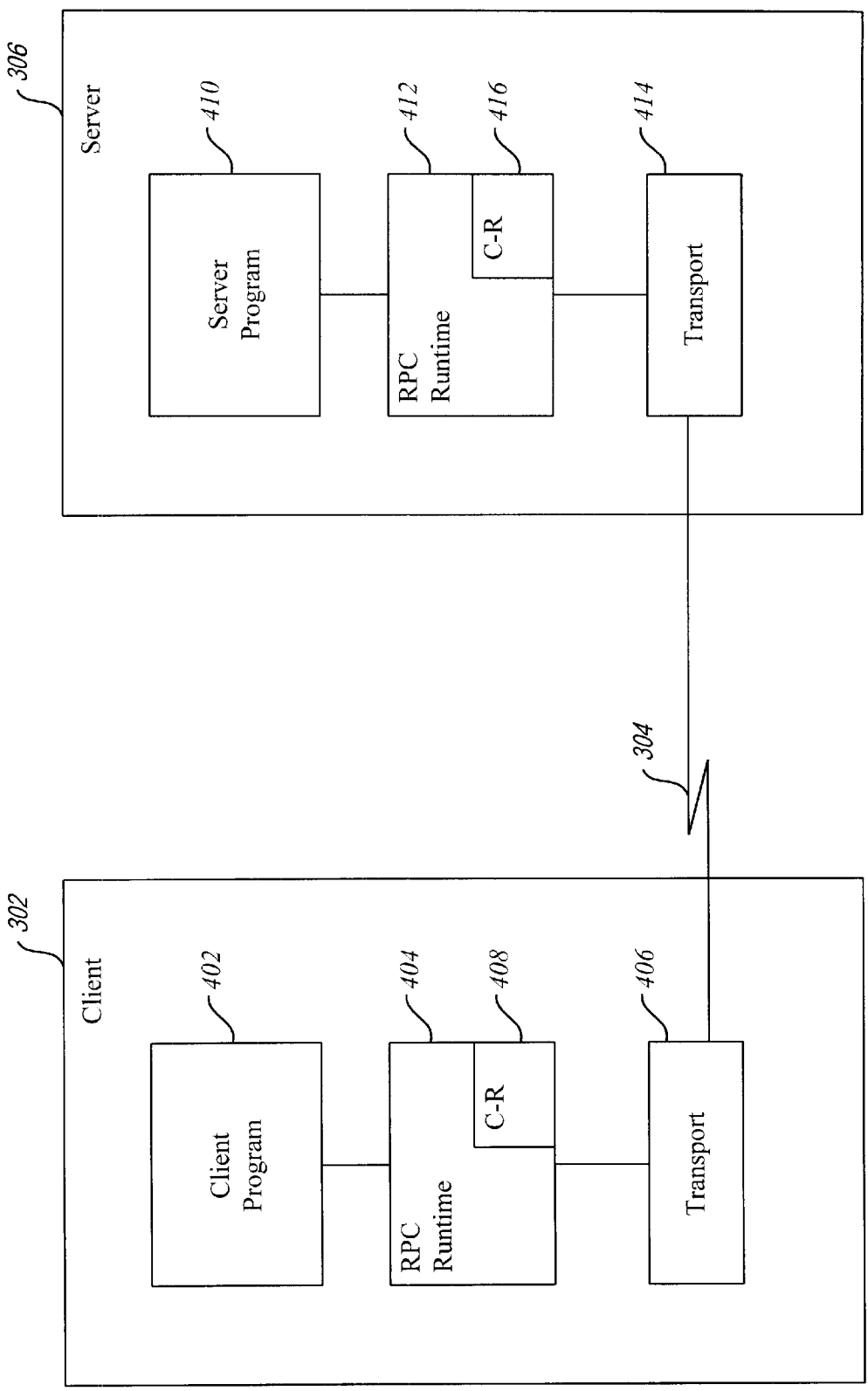
FIG. 4 depicts a more detailed diagram of the client computer and the server computer of FIG. 3.

FIG. 4 depicts the client computer 302 and the server computer 306 of FIG. 3 in more detail. Both the client computer 302 and the server computer 306 contain a computer program (client program 402, server program 410), an RPC runtime facility 404, 412, and a transport layer 406, 414. The client program 402 acts as the originator of a remote procedure call and the server program 410 acts as the recipient of the remote procedure call. The RPC runtime 404 contains a client C-R component 408 and the RPC runtime 412 contains a server C-R component 416. Both the client C-R component 408 and the server C-R component 416 perform authentication using the challenge-response protocol. In addition, the client and server C-R components 408, 416 perform encryption and decryption using any of a number of well-known encryption algorithms such as the data encryption standard (DES) as described in Schneier, *Applied Cryptography*, John Wiley & Sons, Inc., at 219–243, (1994). The transport layers 406, 414 transmit messages between the client computer 302 and the server computer 306 as packets across the network 304 using datagram transmissions. An example of a suitable transport layer 406, 414 is a transport layer performing the transport control protocol/interface program (TCP/IP) protocol, which is a well-known protocol developed by the Defense Department.

Figure 5A:
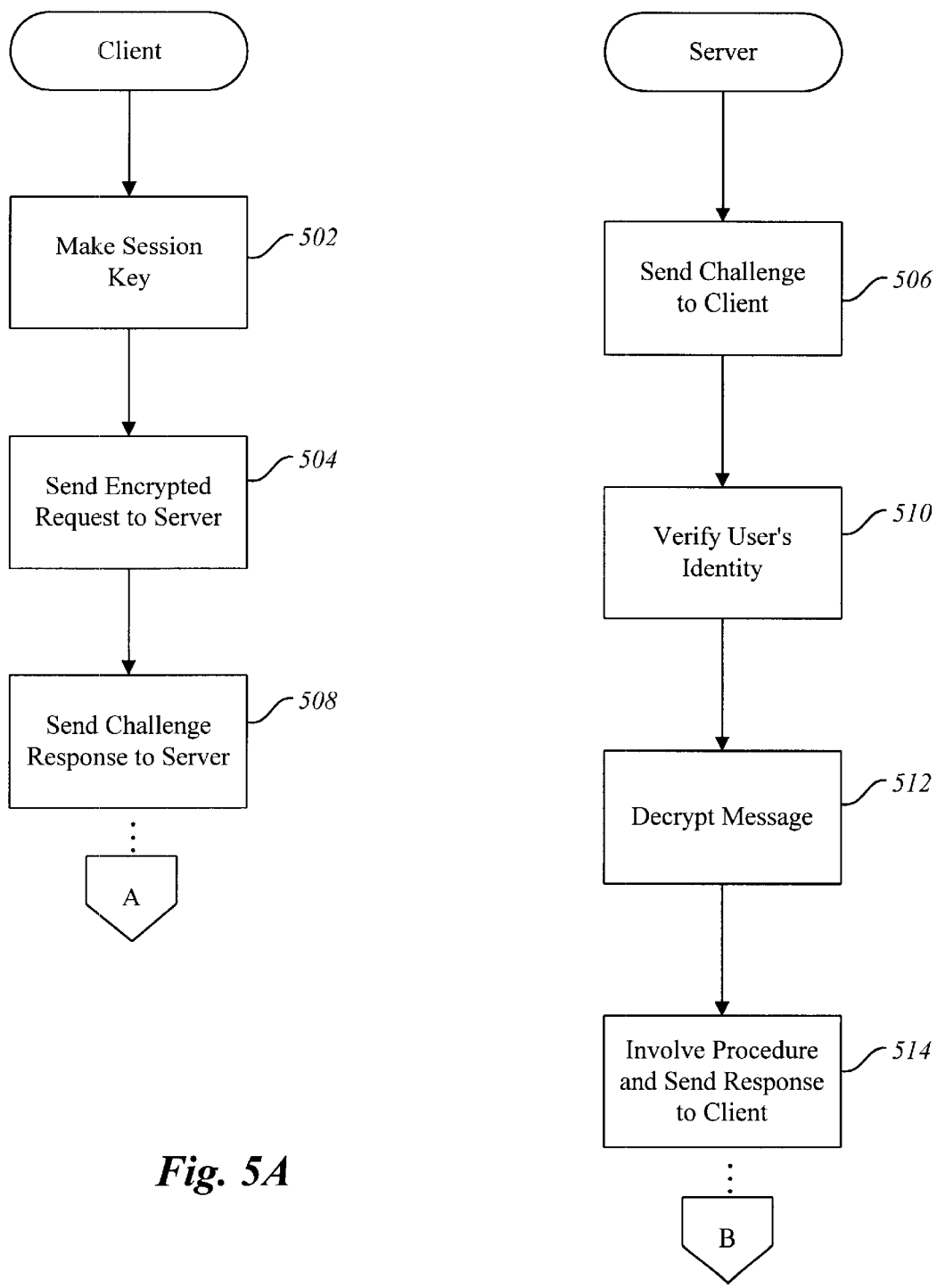
FIGS. 5A and 5B depict a flow chart of the steps performed by the challenge-response protocol components depicted in FIG. 4.
Figure 5B:
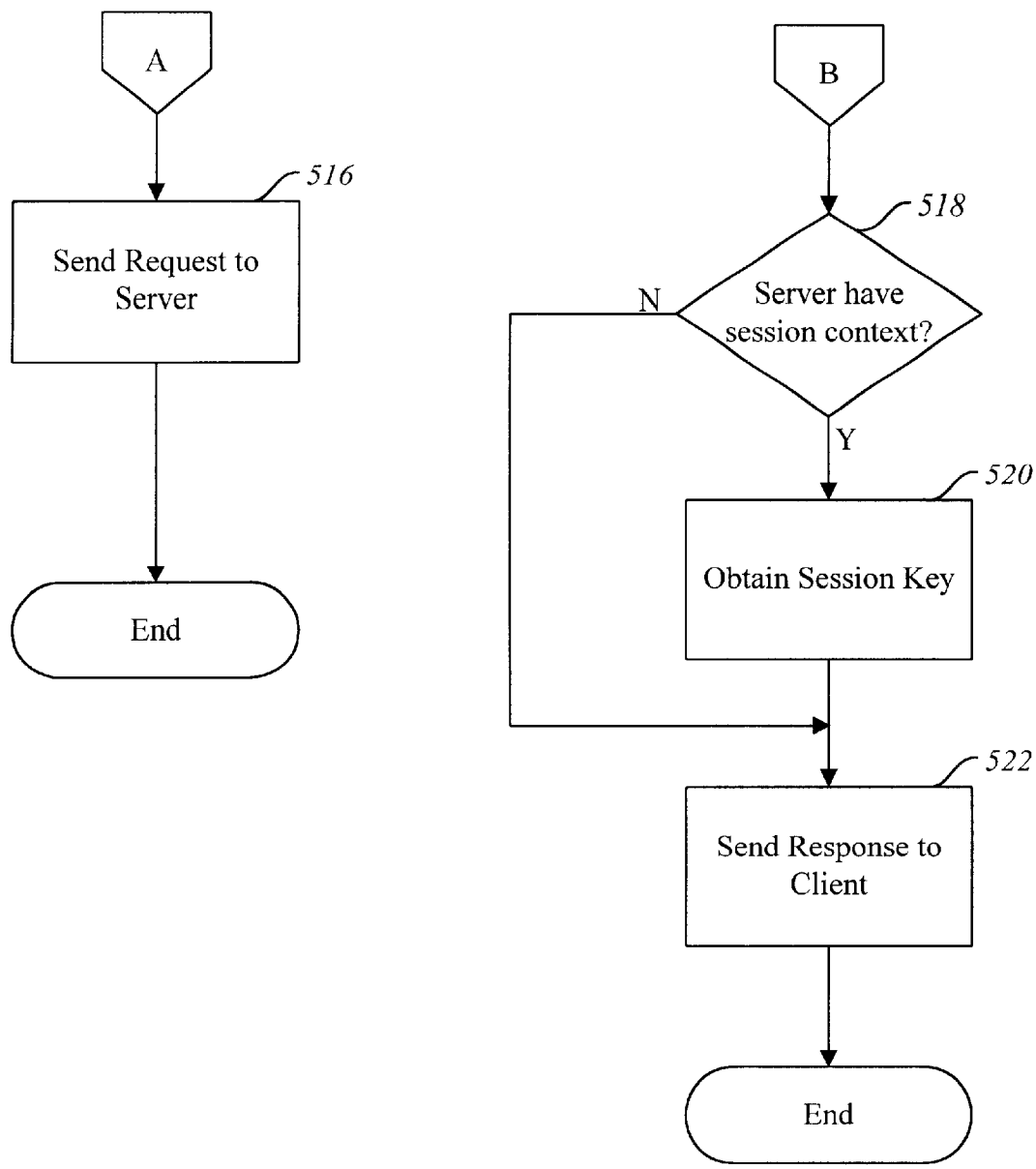

FIGS. 5A and 5B depict a flow chart of the steps performed by the client C-R component 416 and the server C-R component 408 of FIG. 4 during a remote procedure call. The steps depicted in FIGS. 5A and 5B are performed chronologically. The first step performed as part of a remote procedure call is for the client C-R component to generate a session key (step 502). In this step, the client C-R component generates a 16-byte random number which is based on various rapidly-changing system data obtained from the operating system of the client computer. For example, a portion of the session key may be equivalent to a portion of a value indicating the current available memory and another portion of the session key may be equivalent to a value indicating the current packet transfer rates. By using such rapidly changing and unpredictable system data, the session key is considered to be a cryptographically secure random number. Although generating a random number using rapidly changing system data has been described, one skilled in the art will appreciate that the present invention can be used with any of a number of well-known random number generators. The client C-R component then encrypts a message containing a request for an RPC using the DES encryption algorithm and the session key and sends the encrypted message to the server C-R component (step 504).

Figure 6:
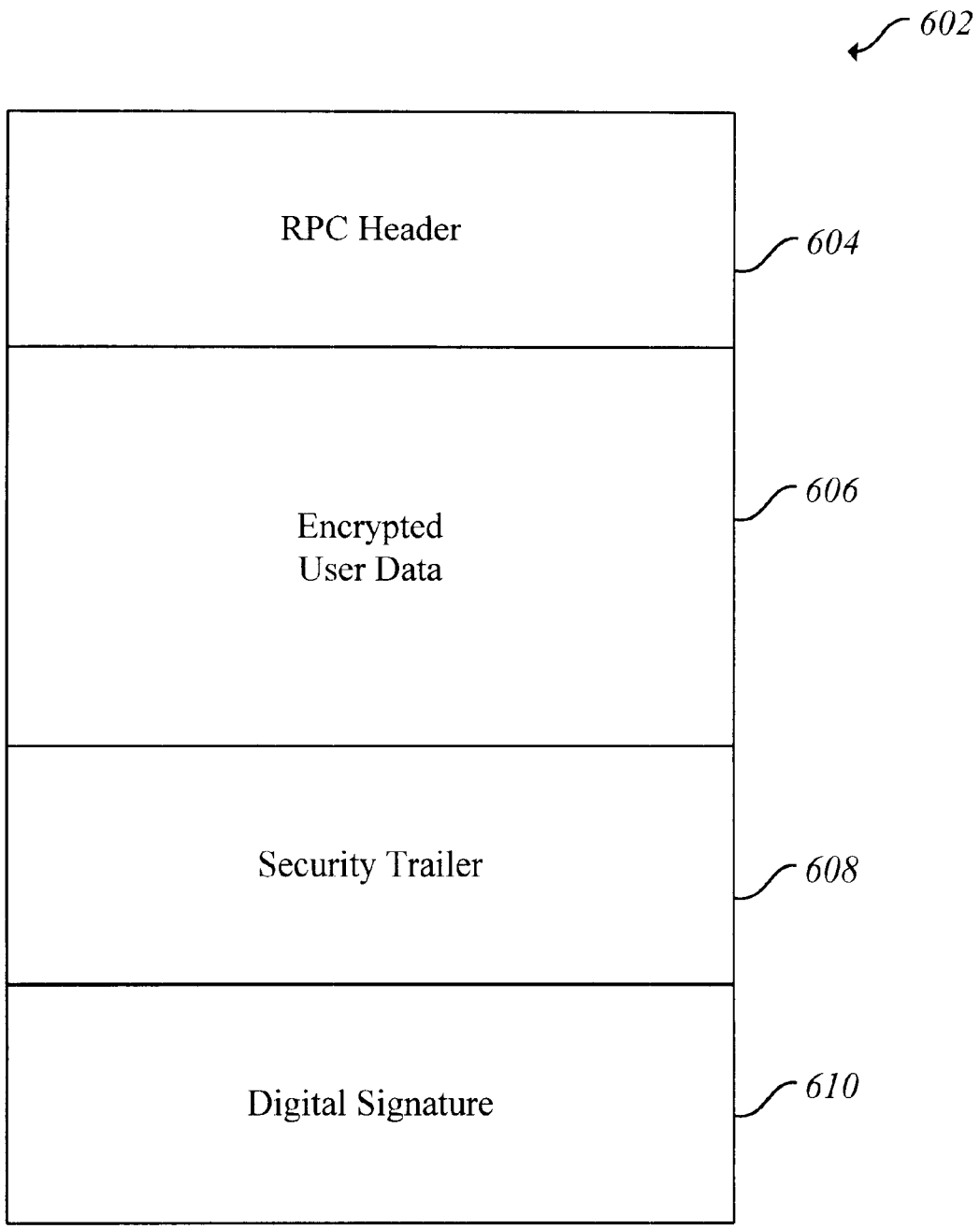
FIG. 6 depicts the remote procedure call request sent from the client challenge-response component to the server challenge-response component depicted in FIG. 4 to initiate a remote procedure call.

The message requesting an RPC sent by the client C-R component is depicted in FIG. 6. The message 602 contains an RPC header 604, encrypted user data 606, a security trailer 608, and a digital signature 610. The RPC header 604 is plain text and contains such information as the sequence number of the packet, an indication of the function to be invoked, and an indication of the server computer program that contains the function. The encrypted user data 606 contains the actual parameters for the remote procedure call. The security trailer 608 indicates the level of security being provided for the session (e.g., whether the messages will be encrypted or not). The digital signature 610 is an encrypted checksum of the entire message 602. The checksum is encrypted with the session key generated in step 502 by the client C-R component. The server C-R component uses the digital signature to determine whether the message has been corrupted during transfer.

In response to receiving the encrypted request, the server C-R component sends a challenge to the client C-R component (step 506). The challenge is an 8-byte unique identifier generated by the server C-R component. The 8-byte unique identifier can be generated using any of a number of well-known techniques for generating a random number like using rapidly-changing system data. The challenge also contains a bit field containing indications of the server's capabilities, such as whether it understands ANSI or UNICODE characters or whether it supports encryption. After sending the challenge to the client C-R component, the client C-R component responds to the challenge by sending a challenge response to the server C-R component (step 508). The challenge response is the challenge encrypted using a key comprising the password of the user of the client computer. The challenge response is 24 bytes in length. The session key is also encrypted, but it is encrypted using an intermediate key. The intermediate key is calculated by encrypting the challenge response with the user's password. When sending the challenge response to the server C-R component, the client C-R component sends its identification information, the challenge response, the encrypted session key, as well as a bit field indicating the capabilities of the server computer that the client C-R component wishes to use.

Upon receiving the challenge response, the server C-R component verifies the user's identity (step 510). The server C-R component performs this processing by sending the challenge response, the challenge and the user name to the domain controller 308. The domain controller 308 accesses the account database 312 to determine the user's password and encrypts the challenge sent in step 506 in a manner similar to that performed by the client C-R component. The domain controller then compares its generated challenge response to the challenge response received from the client C-R component to determine if they are equivalent. If they are equivalent, the domain controller has verified that the user is bona fide. However, if they are not equivalent, an attempted unauthorized access has been detected and appropriate action can be taken like terminating the session. After verification, the domain controller generates the intermediate key used to encrypt the session key and sends the intermediate key to the server C-R component. The server C-R component, using the intermediate key, decrypts the session key and decrypts the request for the RPC sent by the client C-R component in step 504 using the session key. After decrypting the message, the server C-R component invokes the requested procedure of the server program and sends a response to the client (step 514). The response is encrypted and contains any return values or parameters from the remote procedure call and is formatted similar to the request shown in FIG. 6 with the parameters and return values being contained in the encrypted user data portion 606. After sending the response to the client C-R component, the client C-R component and the server C-R component may exchange many requests and responses reflecting remote procedure calls.

At some point later, the server C-R component may discard its context information, including the session key. This event can occur, for example, so that the server C-R component can reduce overhead when it has not received a message from the client C-R component for a while. Steps 516–522 in Figure 5B depict the processing that is performed to resume a session when the server C-R component has discarded the context information. This processing is initiated by the client C-R component sending a request for an RPC to the server (step 516). The server C-R component then determines if it has the context information for this session by checking its local storage (step 518). If the server C-R component does not have the context information for the session, the server C-R component does not have a session key with which to decrypt the received request and therefore obtains the session key (step 520). The server C-R component obtains the session key by sending a challenge to the client C-R component as described in step 506, by receiving an encrypted session key and then by verifying the user's identity as described in step 510. After obtaining the session key, or if the server does have the context information, the server C-R component decrypts the request, invokes the requested function and sends a response to the client C-R component (step 522). Therefore, by using the challenge-response protocol, a preferred embodiment of the present invention can issue a challenge to obtain the session key at the beginning of an RPC, as well as when the server has discarded the context information.

While the present invention has been described with reference to a preferred embodiment thereof, those skilled in the art will know of various changes in form that may be made without departing from the spirit and scope of the claimed invention as defined in the appended claims. For example, alternative authentication protocols may be used instead of the challenge-response protocol.

What is claimed is:

1. A method in a data processing system for a client protocol component and a server protocol component to facilitate secure communication according to a protocol that allows the server protocol component to release security state information that the client protocol component retains, the client protocol component and the server protocol component being interconnected by a network and communicating over the network, the method comprising:

the client protocol component receiving a request for invoking a function of a server computer program from a client computer program, encrypting the request using a key and sending the encrypted request to a server computer via the network;

the server protocol component receiving the encrypted request;

when the server protocol component possesses the key, the server protocol component decrypting the encrypted request using the key; and when the server protocol component lacks the key after selectively releasing security state information including the key, the server protocol component sending a challenge to the client protocol component;

the client protocol component receiving the challenge, encoding the challenge and the key, and sending the encoded challenge and the encoded key to the server protocol component; and the server protocol component receiving the encoded challenge and the encoded key, decoding the encoded challenge and the encoded key, and decrypting the encrypted request using the decoded key.

2. The method of claim 1 further comprising:

the client protocol component generating the key.

3. The method of claim 2 wherein the client computer has an operating system managing resources of the client computer and wherein the generating the key includes retrieving status information of the resources from the operating system and basing a value of the key on the retrieved status information.

4. The method of claim 1 wherein a user of the client computer has a password and wherein the client protocol component encoding the challenge includes encrypting the challenge using the password of the user as an encryption key.

5. The method of claim 4 wherein the server protocol component decoding includes decrypting the encoded challenge using the password of the client as a decryption key.

6. The method of claim 1 wherein the server protocol component decoding includes encrypting the challenge using a password of a user of the client computer as an encryption key and comparing the challenge encrypted by the server protocol component to the challenge encrypted by the client protocol component to verify an identity of the user.

7. The method of claim 1, further including:

the server protocol component discarding the decoded key; and the data processing system repeating as necessary the acts for when the server protocol component lacks the key so that the server protocol component can re-obtain the discarded key.

8. A data processing system for communicating across a network that connects a client computer to a server computer, the data processing system comprising:

a server computer comprising:

a server computer program having a function for remote invocation, wherein the server computer program receives a request to invoke the function from a client computer;

a server challenge-response protocol component that receives an encrypted request to invoke the function, and that as necessary sends a unique identifier to the client computer to request a key so that the encrypted request can be decrypted and passed to the server computer program, wherein the server challenge-response protocol component sends the unique identifier if the server challenge-response protocol component lacks the key, the server challenge-response protocol component unilaterally discarding the key when the server challenge-response protocol component fails to receive any encrypted requests from the client computer within a pre-determined time duration; and a server transport component for sending and receiving a plurality of packets over the network to facilitate the invocation of the function; and the client computer comprising:

a client computer program for sending the request to remotely invoke the function of the server computer program;

a client challenge-response protocol component that receives and encrypts the request to remotely invoke the function, and that as necessary receives the unique identifier from the server challenge-response protocol component, encodes the unique identifier, and sends the encoded unique identifier to the server computer with the key; and a client transport component for sending and receiving the plurality of packets over the network to facilitate the invocation of the function.

9. The data processing system of claim 8 wherein the server challenge-response protocol component decodes the encoded unique identifier to verify the identity of a user of the client computer.

10. The data processing system of claim 8 wherein the key is generated by the client computer.

11. A method in a data processing system for a client computer program on a client computer having a client protocol component to invoke a function of a server computer program on a server computer, the client computer and the server computer being interconnected by a network and communicating over the network, the method performed by the client protocol component comprising:

encrypting using a key a request from the client computer program to invoke the function of the server computer program;

sending the encrypted request to the server computer via the network, the client protocol component lacking reliable information as to whether a server authentication component on the server computer has the key;

when the server authentication component lacks the key after discarding the key, receiving a challenge from the server computer;

creating a response to the challenge by encoding the challenge and encoding the key; and sending the response to the server computer so that the server computer can verify an identity of an originator of the request and so that the server computer can decrypt the encrypted request to invoke the function.

12. The method of claim 11 further comprising:

generating the key.

13. A method in a data processing system for a client computer program on a client computer to invoke a function of a server computer program on a server computer having a server authentication component, the client computer and the server computer being interconnected by a network and communicating over the network, the method performed by the server authentication component comprising:

receiving an encrypted request for an invocation of the function from the client computer, wherein the request is encrypted using a key; checking by the server authentication component whether the server authentication component has the key, the server authentication component selectively discarding the key according to a connectionless security model, and if the server authentication component lacks the key, sending a challenge that requests the key to the client computer via the network;

receiving a response from the client computer containing an encoded challenge and an encoded key;

decoding the encoded key;

evaluating the encoded challenge to verify an identity of a user of the client computer; and decrypting the encrypted request with the key.

14. The method of claim 13 wherein the evaluating the encoded challenge includes encoding the challenge to create a second encoded challenge and comparing the second encoded challenge to the first encoded challenge to detect unauthorized access of the server computer.

15. A method in a data processing system for transmitting a message from a first computer system to a second computer system using an encryption key generated unilaterally by the first computer system, the first computer system and the second computer system being interconnected by a network and communicating over the network, the method comprising:

the first computer system generating a first encryption key to use in communicating with the second computer system;

the first computer system sending a message to the second computer system via the network, the message being encrypted with the first encryption key, wherein the first computer system sends the message whether or not the second computer system has the first encryption key according to a connectionless security protocol;

the second computer system receiving the message;

the second computer system decrypting the message with the first encryption key when possible to do so, otherwise, sending a unique identifier to the first computer system;

the first computer system receiving the unique identifier, encrypting the unique identifier using a password of the first computer system as a second encryption key, and sending the encrypted unique identifier with an encrypted version of the first encryption key to the second computer system;

the second computer system receiving the encrypted unique identifier, encrypting the unique identifier using the password of the first computer system, and comparing the encrypted unique identifier encrypted by the first computer system to the encrypted unique identifier encrypted by the second computer system to determine equivalence thereof, wherein when the encrypted unique identifier encrypted by the first computer system is equivalent to the encrypted unique identifier encrypted by the second computer system, the identity of the first computer system is verified; and if the identity of the first computer system is verified, the second computer system decrypting the first encryption key and using the decrypted first encryption key to decrypt the message.

16. A computer-readable medium containing instructions for controlling a data processing system to perform a method, the method for a client computer program on a client computer having a client protocol component to invoke a function of a server computer program on a server computer having a server protocol component, the client computer and the server computer being interconnected by a network and communicating over the network, the method comprising:

the client protocol component receiving a request for invoking the function of the server computer program from the client computer program, encrypting the request using a key and sending the encrypted request to the server computer via the network;

the server protocol component receiving the encrypted request;

when the server protocol component possesses the key, the server protocol component decrypting the encrypted request using the key; and when the server protocol component lacks the key after independently discarding the key to reduce server overhead, the server protocol component sending a challenge containing a unique identifier to the client protocol component;

the client protocol component receiving the challenge, encoding the challenge and the key, and sending the encoded challenge and the encoded key to the server protocol component; and the server protocol component receiving the encoded challenge and the encoded key, decoding the encoded challenge and the encoded key, and decrypting the encrypted request using the decoded key.

17. The computer-readable medium of claim 16 further comprising:

the client protocol component generating the key.

18. The computer-readable medium of claim 16 wherein the method further includes:

the server protocol component discarding the decoded key; and the data processing system repeating as necessary the acts for when the server protocol component lacks the key so that the server protocol component can re-obtain the discarded key.

19. A computer-readable medium having stored thereon a data structure storing response data representing a response to a challenge, the challenge made by a first computer system to a second computer system and indicating a challenge value, the response data comprising:

a response value generated by encrypting the challenge value using a pre-determined key in the possession of the first and second computer systems; and a session key for use in communications between the first and second computer systems, such that if the first computer system determines that the response value is proper in view of the challenge value, the first computer system uses the session key to communicate with the second computer system during a session according to a security model under which the first computer system selectively releases session security state information that the second computer system retains.

20. The computer-readable medium of claim 19 wherein the session key of the response data is encrypted.

21. A computer-readable medium storing instructions for performing on a client a method of secure message communication for a session between the client and a server according to a connectionless security model, the method comprising:

encrypting a message with a session key;

sending the encrypted message to a server via the network, the client lacking reliable information as to whether a security component on the server has the session key;

when the security component lacks the session key after discarding the session key,
receiving a challenge;
creating an encrypted version of the session key; and
sending the encrypted version of the session key to the server for decryption of the encrypted message after decryption of the encrypted version of the session key.

22. The computer-readable medium of claim 21 wherein the method further comprises:

creating a challenge-response, wherein the challenge-response is the challenge encrypted with a user password retained by the client and the server, and wherein the encrypted version of the session key is encrypted based upon the user password; and sending the challenge-response to the server for authentication.

23. A computer-readable medium storing instructions for performing on a server a method of secure message communication for a session between a client and the server, the method comprising:

receiving an encrypted message from a client, the message encrypted with a session key;

checking by a security component on the server whether the security component has the session key, the security component selectively discarding the session key, and if the security component lacks the session key,
sending a challenge that requests the session key to the client;
receiving an encrypted version of the session key from the client;
decrypting the encrypted version of the session key; and decrypting the encrypted message with the session key.

24. The method of claim 23 wherein the method further comprises:

receiving a challenge-response from the client; and evaluating the challenge-response for authentication, including encrypting the challenge to create a second challenge-response and comparing the second challenge-response to the first challenge-response.

25. A method in a computer system for securely transmitting messages between a client and a server, the client including a client-side security context, the server including a connectionless server-side security context, the client and the server communicating over a network, the method comprising:

establishing by a client a client-side security context;

encrypting by the client one or more messages with a key;

sending by the client the one or more encrypted messages to a server;

checking by the server whether the server has security state information including the key, a connectionless server-side security context on the server selectively releasing security state information that the client-side security context keeps;

as necessary when the server lacks security state information, authenticating the client and obtaining the key from the client;

decrypting the encrypted message with the key.

26. A server system for secure session message communication with one or more client systems, the system comprising:

a server network communication component that receives an encrypted message from a first client system over a network, the encrypted message encrypted with a session key;

a server security component that decrypts the encrypted message with the session key, as necessary performing authentication of the first client system and obtaining the session key, wherein the server security component selectively releases session security state information including the session key according to a connectionless security model; and a server computer program that receives the decrypted message.

27. The system of claim 26 wherein the server network communication component supports logically connectionless message communication for which the server network communication component cannot provide logical connection status information to the server security component.

28. A client system for session message communication with a server system according to a connectionless security model, the system comprising:

a client computer program that generates a message for sending to a server computer program;

a client security component that encrypts the message with a session key for a session, the client security component as necessary providing the session key and authentication information to the server system, wherein the client security component retains security state information for the session that a server security component of the server system selectively releases, and wherein the client security component lacks reliable information as to whether the server security component currently has the security state information for the session;

a client network communication component that supports logically connectionless message transfer with the server system.

* * * * *